(12) United States Patent
Chun et al.

(10) Patent No.: US 12,472,486 B2
(45) Date of Patent: Nov. 18, 2025

(54) MOLDING CATALYST FOR HYDROGEN CHLORIDE OXIDATION REACTION, AND METHOD FOR PRODUCING SAME

(71) Applicant: HANWHA SOLUTIONS CORPORATION, Seoul (KR)

(72) Inventors: Jeong Hwan Chun, Daejeon (KR); Seong Ho Yun, Daejeon (KR); Young Jin Cho, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 559 days.

(21) Appl. No.: 17/790,287

(22) PCT Filed: Oct. 19, 2020

(86) PCT No.: PCT/KR2020/014260
§ 371 (c)(1),
(2) Date: Jun. 30, 2022

(87) PCT Pub. No.: WO2021/137400
PCT Pub. Date: Jul. 8, 2021

(65) Prior Publication Data
US 2023/0072554 A1    Mar. 9, 2023

(30) Foreign Application Priority Data
Dec. 31, 2019 (KR) .................. 10-2019-0179867

(51) Int. Cl.
| | | |
|---|---|---|
| *B01J 21/04* | (2006.01) | |
| *B01D 53/86* | (2006.01) | |
| *B01D 53/94* | (2006.01) | |
| *B01J 21/06* | (2006.01) | |
| *B01J 21/08* | (2006.01) | |
| *B01J 21/12* | (2006.01) | |
| *B01J 23/63* | (2006.01) | |
| *B01J 35/37* | (2024.01) | |
| *B01J 35/40* | (2024.01) | |
| *B01J 35/50* | (2024.01) | |
| *B01J 35/61* | (2024.01) | |
| *B01J 35/63* | (2024.01) | |
| *B01J 35/64* | (2024.01) | |

(52) U.S. Cl.
CPC .......... *B01J 23/63* (2013.01); *B01D 53/8659* (2013.01); *B01D 53/945* (2013.01); *B01J 21/063* (2013.01); *B01J 35/37* (2024.01); *B01J 35/40* (2024.01); *B01J 35/50* (2024.01); *B01J 35/613* (2024.01); *B01J 35/615* (2024.01); *B01J 35/635* (2024.01); *B01J 35/647* (2024.01); *B01D 2255/1026* (2013.01); *B01D 2255/2065* (2013.01); *B01D 2255/20707* (2013.01); *B01D 2256/26* (2013.01); *B01D 2257/2042* (2013.01); *B01D 2258/02* (2013.01); *B01J 2231/70* (2013.01); *B01J 2523/3712* (2013.01); *B01J 2523/47* (2013.01); *B01J 2523/821* (2013.01)

(58) Field of Classification Search
CPC ........ B01J 21/04; B01J 21/063; B01J 21/066; B01J 21/08; B01J 23/462; B01J 35/613; B01J 35/615; B01J 35/635; B01D 53/8659; B01D 53/945
See application file for complete search history.

(56) References Cited

U.S. PATENT DOCUMENTS

| | | | | |
|---|---|---|---|---|
| 5,908,607 | A * | 6/1999 | Abekawa | B01J 23/462 502/325 |
| 6,852,667 | B2 * | 2/2005 | Hibi | B01J 23/462 502/325 |
| 7,858,065 | B2 * | 12/2010 | Seki | B01J 23/96 423/491 |
| 8,518,850 | B2 * | 8/2013 | Szillat | B01J 35/56 502/232 |
| 9,084,985 | B2 * | 7/2015 | Iida | B01J 21/18 |
| 9,199,230 | B2 * | 12/2015 | Szillat | C04B 35/46 |
| 9,610,567 | B2 * | 4/2017 | Henze | B01J 35/40 |
| 9,889,431 | B2 * | 2/2018 | Seki | B01J 35/612 |
| 11,213,805 | B2 * | 1/2022 | Mikhajlov | C01B 3/40 |
| 2002/0172640 | A1 * | 11/2002 | Hibi | B01J 23/462 423/502 |
| 2010/0068126 | A1 | 3/2010 | Seki | |

(Continued)

FOREIGN PATENT DOCUMENTS

| | | |
|---|---|---|
| CN | 109806864 A | 5/2019 |
| JP | 2002-292279 A | 10/2002 |

(Continued)

OTHER PUBLICATIONS

Qiguang Dai et al, The effect of TiO2 doping on catalytic performances of Ru/CeO2 ~ of chlorobenzene, Applied Catalysis B: Environmental 142~143, p. 222~233, May 23, 2013.

D2—Ru—CeOxTiO2 composite oxide for catalytic oxidation of HCL to Cl2, Chemical Industry and Engineering Progress, Shi Jian et al.

Jose I. Gutierrez-Ortiz et al., Combustion of aliphatic C2 chlorohydrocarbons over ceria-zirconia mixed oxides catalysts, Applied Catalysis A: General 269, 1-2, p. 147~155, May 25, 2004.

Amrute, Amol P. et al, Performance, structure, and mechanism of CeO2 in HCl oxidation to Cl2, Journal of Catalysis (2012), 286, p. 287~297, Dec. 26, 2011.

(Continued)

*Primary Examiner* — Cam N. Nguyen
(74) *Attorney, Agent, or Firm* — Harvest IP Law, LLP

(57) ABSTRACT

The present invention relates to a method for producing a molding catalyst for obtaining chlorine ($Cl_2$) through an oxidation reaction of hydrogen chloride (HCl), and more specifically, to a method for producing an oxidation reaction molding catalyst by adding heterogeneous material to a ruthenium oxide ($RuO_2$)-supported catalyst having titanium oxide ($TiO_2$) as a supporting body, and molding so as to be usable in a fixed bed reactor to produce chlorine ($Cl_2$) from hydrogen chloride (HCl).

8 Claims, No Drawings

(56) References Cited

U.S. PATENT DOCUMENTS

| | | | | |
|---|---|---|---|---|
| 2011/0189079 A1* | 8/2011 | Seki | ............... | B01J 20/08 423/502 |
| 2011/0268649 A1* | 11/2011 | Henze | ............... | C01B 7/04 423/502 |
| 2012/0027665 A1* | 2/2012 | Henze | ............... | C01B 7/04 502/328 |
| 2013/0039842 A1* | 2/2013 | Nishida | ............... | B01J 37/0018 423/502 |
| 2013/0289145 A1* | 10/2013 | Miura | ............... | B01J 23/462 518/715 |
| 2023/0042463 A1* | 2/2023 | Yun | ............... | B01J 35/615 |

FOREIGN PATENT DOCUMENTS

| | | |
|---|---|---|
| JP | 2010-524673 A | 7/2010 |
| JP | 2010-533113 A | 10/2010 |
| JP | 2011-183237 A | 9/2011 |
| JP | 2011-183238 A | 9/2011 |
| JP | 2013146720 A | 8/2013 |
| JP | 2013-169517 A | 9/2013 |
| JP | 2013-184083 A | 9/2013 |
| JP | 2014-503341 A | 2/2014 |
| JP | 2014105128 A | 6/2014 |
| JP | 2014-522797 A | 9/2014 |
| KR | 10-2009-0084949 A | 8/2009 |
| KR | 10-2014-0102205 A | 8/2014 |
| WO | 2004-004895 A1 | 1/2004 |

OTHER PUBLICATIONS

M. Moser et al, Supported CeO2 catalysts in technical form for sustainable chlorine production, Applied Catalysis B: Environmental 132-133, p. 123~131, Nov. 28, 2012.

Qiguang Dai et al, Catalytic combustion of chlorobenzene over Ru-doped ceria catalysts: Mechanism study, Applied Catalysis B: Environmental, 129, p. 580~588, Oct. 16, 2012.

* cited by examiner

MOLDING CATALYST FOR HYDROGEN CHLORIDE OXIDATION REACTION, AND METHOD FOR PRODUCING SAME

CROSS-REFERENCE TO RELATED APPLICATIONS

This application is a National Stage of International Application No. PCT/KR2020/014260 filed Oct. 19, 2020, claiming priority based on Korean Patent Application No. 10-2019-0179867 filed Dec. 31, 2019, the disclosure of which is incorporated herein by reference in its entirety.

TECHNICAL FIELD

The present invention relates to a method for producing a molding catalyst for obtaining chlorine ($Cl_2$) through an oxidation reaction of hydrogen chloride (HCl), and more specifically, to a method for producing an oxidation reaction molding catalyst by adding heterogeneous material to a ruthenium oxide ($RuO_2$)-supported catalyst having titanium oxide ($TiO_2$) as a supporting body, and molding so as to be usable in a fixed bed reactor to produce chlorine ($Cl_2$) from hydrogen chloride (HCl).

BACKGROUND ART

According to the catalytic oxidation method of hydrogen chloride developed by Deacon in 1868, hydrogen chloride is oxidized with oxygen to form chlorine in an exothermic equilibrium reaction. Hydrogen chloride is formed in large quantities as a co-product in phosgenation reaction, for example, in the production of isocyanate. The hydrogen chloride formed during the production of isocyanate is mainly used in oxychlorination reaction of ethylene to 1,2-dichloroethane, which is subsequently treated to form vinyl chloride and finally polyvinyl chloride (PVC). In Korea, most hydrochloric acid and hydrogen chloride are manufactured and sold in aqueous solution phase (20% or 35% hydrochloric acid), except for the reaction of producing VCM (Vinyl Chloride Monomer) by reacting hydrogen chloride with ethylene in the OxyChlorination reactor, or are discarded after neutralization treatment.

Catalysts used in the hydrogen chloride oxidation reaction include a ruthenium-based catalyst, a copper-based catalyst, and a cerium-based catalyst. The ruthenium-based catalyst has a lower reaction temperature with a small amount of catalyst than the copper-based catalyst or the cerium-based catalyst.

In general, the reaction for producing chlorine by oxidation of hydrogen chloride is an equilibrium reaction. As the reaction temperature is higher, it is more disadvantageous in equilibrium and an equilibrium conversion rate is lowered. Therefore, a catalyst having a lower reaction temperature becomes more advantageous in equilibrium in the reaction, and a higher conversion rate of hydrogen chloride can be obtained. However, most of the conventional catalysts mainly exhibit high activity at high temperatures, and also exhibit a phenomenon in which catalyst performance decreases in a short period of several months during high-temperature operation.

That is, it is difficult for a supported ruthenium oxide to simultaneously satisfy both conditions for thermal stability and catalyst life. Furthermore, most of these catalysts have many restrictions on their use because the types of reactor, operating conditions, and the like are difficult. In particular, when a powder-type catalyst is used in a fixed bed reactor, a differential pressure is generated at the front and rear ends of a catalyst bed, which may cause a problem in that operation is impossible. Therefore, in order to solve the various problems described above, research into various catalysts is currently in progress.

For example, Japanese Patent Publication No. 2014-522797 relates to a method for producing chlorine using a cerium oxide catalyst in an isothermal reactor, and discloses that a gas phase oxidation reaction of hydrogen chloride is possible using a catalyst of ruthenium and cerium oxide supported on titanium oxide. In particular, it discloses a process using a ruthenium oxide catalyst and a cerium oxide catalyst charged in different layers.

In addition, Japanese Patent Publication No. 2014-503341 relates to a catalyst for producing chlorine by oxidation of hydrogen chloride and a method for producing the same, and discloses that a catalyst prepared by supporting complex active ingredients, such as cerium, ruthenium, and copper, on titanium dioxide is applied to the oxidation reaction of hydrogen chloride.

In addition, Japanese Patent Publication No. 2010-533113 discloses a technique for applying a hydrogen chloride oxidation reaction by supporting a cerium or ruthenium catalyst on a support such as titanium oxide. In particular, it is characterized in that the reaction efficiency is improved while simplifying an equipment by omitting a heat removal means in a reactor.

Lastly, Korean Patent Publication No. 10-2014-0102205 discloses a method for producing supported ruthenium oxide that can efficiently support silica on a titania support and has excellent thermal stability and catalyst life. It is characterized in that it provides a method for stably producing chlorine over a long period of time using supported ruthenium oxide.

As described above, a variety of catalysts applied to the hydrogen chloride oxidation reaction are being researched and developed. As a part of this, the present invention has been completed to provide the development of a catalyst for hydrogen chloride oxidation reaction that is easy to handle and has no restrictions on use, regardless of the type and operating conditions of a reactor, while maintaining the performance of the catalyst for a long time even at high temperatures by securing thermal stability.

(Patent Literature 1) Japanese Patent Publication No. 2014-522797 (2014.09.08)
(Patent Literature 2) Japanese Patent Publication No. 2014-503341 (2014.10.03)
(Patent Literature 3) Japanese Patent No. 2010-533113 (2010.10.21)
(Patent Literature 4) Korean Patent Publication No. 10-2014-0102205 (2014.08.21)

DESCRIPTION OF EMBODIMENTS

Technical Problem

The present invention aims to solve the above-described problems.

An object of the present invention is to provide a catalyst that is not restricted by the type of reactor, operating conditions, and the like, has no restrictions on use, and is easy to handle.

An object of the present invention is to provide a variety of catalyst molding methods, thereby controlling and enhancing catalytic activity and thermal stability and enabling the catalyst molding methods to be applied to various uses.

Solution to Problem

In order to achieve the above-described objects of the present invention and realize the characteristic effects of the present invention described below, the characteristic configuration of the present invention is as follows.

According to an embodiment of the present invention, the catalyst is provided by including 0.5 to 20 parts by weight of a heterogeneous material, 0.1 to 20 parts by weight of ruthenium oxide as an active component, and 60 to 99 parts by weight of a support based on 100 parts by weight of the catalyst.

According to an embodiment of the present invention, there is provided a method for producing a molding catalyst for hydrogen chloride oxidation reaction, the method including: a first supporting step of supporting a solution, in which at least one selected from heterogeneous materials is dissolved, on a support; a step of obtaining a solid by performing primary drying, calcining, and cooling after the first supporting step; a step of preparing a molded support by mixing and molding an organic binder, an inorganic binder, and water with the solid; a step of preparing a molded body after performing secondary drying, calcining, and cooling on the molding support; a second supporting step of preparing a solution in which a ruthenium precursor is dissolved and supporting the molded body; and a step of performing tertiary drying and calcining after the second supporting step.

According to an embodiment of the present invention, there is provided a method for producing a molding catalyst for hydrogen chloride oxidation reaction, the method including: a step of preparing a molding support by mixing and molding an organic binder, an inorganic binder, and water in a support; a step of preparing a molded body after performing primary drying, calcining, and cooling on the molded support; a step of supporting a solution, in which at least one selected from heterogeneous materials and a ruthenium precursor are dissolved, on the molded body; and a step of performing secondary drying and calcining after the supporting step.

According to an embodiment of the present invention, there is provided a method for producing a molding catalyst for hydrogen chloride oxidation reaction, the method including: a step of preparing a molded support by mixing an organic binder, an inorganic binder and water with a support; a step of preparing a molded body by performing primary drying, calcining, and cooling after the molding step; a first supporting step of supporting a solution, in which at least one precursor selected from heterogeneous materials is dissolved, on the molded body; a step of obtaining a solid body by performing secondary drying, calcining, and cooling after the first supporting step; a second supporting step of supporting a solution, in which a ruthenium precursor is dissolved, on the molded body; and a step of performing tertiary drying and calcining after the second supporting step.

According to an embodiment of the present invention, there is provided a method for producing chlorine through hydrogen chloride oxidation reaction in the presence of the molding catalyst.

Advantageous Effects of Disclosure

A catalyst according to the present invention is not restricted by the type of reactor, operating conditions, and the like, has no restrictions on use, and is easy to handle.

A molding catalyst produced according to the present invention can be used without generating differential pressure when applied to a fixed bed reactor, and can increase catalytic activity and enhance thermal stability, thereby providing the effect of improving durability.

The molding catalyst produced according to the present invention can be oxidized with anhydrous hydrochloric acid through a fixed bed reactor.

According to the present invention, various catalyst molding methods are provided and can be utilized for various purposes.

BEST MODE

Hereinafter, the structure and operation of the present invention will be described in more detail with reference to preferred examples of the present invention. However, these examples are shown by way of illustration and should not be construed as limiting the present invention in any sense. Since contents not described herein can be sufficiently technically inferred by those of ordinary skill in the art, descriptions thereof will be omitted.

Example 1

A precursor solution in which 2.6 g of cerium nitrate hydrate (Kanto) was dissolved in 6.0 g of DIW was impregnated in 20.0 g of titania powder (SAKAI) and dried in an oven at 100° C. for 4 hours. The dried powder was calcined in an electric furnace at 350° C. for 3 hours to obtain a $TiO_2\_5.0\ CeO_2$ powder support in which an amount of ceria was 5.0%. A paste was formed by evenly mixing 20 g of the $TiO_2\_5.0\ CeO_2$ powder support, 0.4 g of a cellulose-based organic binder (YUKEN), 2.5 g of $TiO_2$ sol (SAKAI), and 9.0 g of DIW. The paste was put into a piston extruder and a molding support was formed by extruding the paste. The molding support was dried in an oven at 100° C. for 4 hours. After cutting the dried molding support at intervals of 2-3 mm, the molding support was calcined in an electric furnace at 600° C. for 3 hours to complete a $TiO_2\_5.0\ CeO_2$ pellet support. A precursor solution in which 0.8 g of ruthenium chloride hydrate (KOJIMA) was dissolved in 6.0 g of DIW was impregnated in 20 g of the $TiO_2\_5.0\ CeO_2$ pellet support and dried in an oven at 100° C. for 4 hours. Finally, the dried pellet was calcined in an electric furnace at 350° C. for 3 hours to obtain a $RuO_2$—$CeO_2/TiO_2$ pellet catalyst in which an amount of ruthenium oxide was 2.0% and an amount of ceria was 5.0%.

Example 2

A paste was formed by evenly mixing 20 g of titania powder (SAKAI), 0.4 g of a cellulose-based organic binder (YUKEN), 2.5 g of $TiO_2$ sol (SAKAI), and 9.0 g of DIW. The paste was put into a piston extruder and a molding support was formed by extruding the paste. The molding support was dried in an oven at 100° C. for 4 hours. After cutting the dried molding support at intervals of 2-3 mm, the molding support was calcined in an electric furnace at 600° C. for 3 hours to complete a $TiO_2$ pellet support. A precursor solution in which 2.6 g of cerium nitrate hydrate (Kanto) and 0.8 g of ruthenium chloride hydrate (KOJIMA) were simultaneously dissolved in 6.0 g of DIW was impregnated in the $TiO_2$ pellet support and dried in an oven at 100° C. for 4 hours. The dried pellet was calcined in an electric furnace at 350° C. for 3 hours to obtain a $RuO_2$—$CeO_2/TiO_2$ pellet catalyst in which an amount of ruthenium oxide was 2.0% and an amount of ceria was 5.0%.

Example 3

A paste was formed by evenly mixing 20 g of titania powder (SAKAI), 0.4 g of a cellulose-based organic binder (YUKEN), 2.5 g of $TiO_2$ sol (SAKAI), and 9.0 g of DIW. The paste was put into a piston extruder and a molding support was formed by extruding the paste. The molding support was dried in an oven at 100° C. for 4 hours. After cutting the dried molding support at intervals of 2-3 mm, the molding support was calcined in an electric furnace at 600° C. for 3 hours to complete a $TiO_2$ pellet support. A precursor solution in which 2.6 g of cerium nitrate hydrate (Kanto) was dissolved was impregnated in the $TiO_2$ pellet support and dried in an oven at 100° C. for 4 hours. The dried pellet was calcined in an electric furnace at 350° C. for 3 hours to obtain a $CeO_2/TiO_2$ pellet in which an amount of ceria was 5.0%. The $CeO_2/TiO_2$ pellet thus obtained was impregnated in a precursor solution in which 0.8 g of ruthenium chloride hydrate (KOJIMA) was dissolved in 6.0 g of DIW, and then dried in an oven at 100° C. for 4 hours. The dried pellet was calcined in an electric furnace at 350° C. for 3 hours to obtain a $RuO_2$—$CeO_2/TiO_2$ pellet catalyst in which an amount of ruthenium oxide was 2.0% and an amount of ceria was 5.0%.

Comparative Example 1

A solution prepared by dissolving 0.5 g of cerium nitrate hydrate (Kanto) in 5.0 g of DIW was impregnated in 10.0 g of titania powder (Sakai) and then dried in air at 100° C. for 4 hours. The dried solid was calcined in an electric furnace at 350° C. for 3 hours under air flow and then slowly cooled to room temperature. The solid thus obtained was put into a solution prepared by dissolving 1.08 g of ruthenium nitrosyl nitrate (Alfa-Aesar) dissolved in a nitric acid solution in 320.0 g of DIW, stirred at room temperature for 5 hours, and then dried using a rotary evaporator. The dried solid was calcined in an electric furnace at 350° C. for 3 hours under air flow and slowly cooled to room temperature to finally obtain a $RuO_2$—$CeO_2/TiO_2$ powder catalyst in which an amount of ruthenium oxide was 2.0% and an amount of ceria was 5.0%. Experimental Example 1 for evaluation of catalytic activity and Experimental Example 2 for evaluation of thermal stability were carried out under the following conditions.

Comparative Example 2

A paste was formed by evenly mixing 20 g of titania powder (SAKAI), 0.4 g of a cellulose-based organic binder (YUKEN), 2.5 g of $TiO_2$ sol (SAKAI), and 9.0 g of DIW. The paste was put into a piston extruder and a molding support was formed by extruding the paste. The molding support was dried in an oven at 100° C. for 4 hours. After cutting the dried molding support at intervals of 2-3 mm, the molding support was calcined in an electric furnace at 600° C. for 3 hours to complete a $TiO_2$ pellet support. A precursor solution in which 0.8 g of ruthenium chloride hydrate (KOJIMA) was dissolved in 6.0 g of DIW was impregnated in a $TiO_2$ pellet support and then dried in an oven at 100° C. for 4 hours. The dried pellet was calcined in an electric furnace at 350° C. for 3 hours to obtain a $RuO_2/TiO_2$ pellet catalyst in which an amount of ruthenium oxide was 2.0%.

Experimental Example 1—Evaluation of Catalytic Activity 1.35 g of the catalysts produced in Examples and Comparative Examples were charged in a nickel reaction tube (a tube with an outer diameter of 1 inch). In the reaction tube, a catalyst layer was heated to a temperature of 300° C., and the reaction was performed by supplying hydrogen chloride and oxygen gas at a rate of 100 mL/min under normal pressure. After 2 hours from the start of the reaction, sampling was performed for 10 minutes by flowing the gas from the outlet of the reaction tube through a 15% aqueous potassium iodide solution. Then, the amount of chlorine produced was measured by iodometric titration, and the conversion rate of hydrogen chloride was calculated by the following equation. The results thereof are shown in [Table. 1].

$$\text{Space time yield} = \frac{\text{Amount of chlorine gas}(g_{cl_2})}{(\text{Amount of catalyst}(g_{cat})) \times (\text{Reaction time}(hr))} \quad \text{[Equation 1]}$$

Experimental Example 2—Evaluation of Thermal Stability

After performing the reaction for 24 hours under the conditions of Experimental Example 1, the amount of chlorine produced was measured and the hydrogen chloride conversion rate A was calculated. After that, the catalyst layer was heated to a temperature of 380° C., the reaction was performed under the same flow rate condition for 24 hours, and the temperature of the catalyst layer was lowered to 300° C. Then, the reaction was performed for 2 hours under the same flow rate condition, and the amount of chlorine produced was measured to calculate the hydrogen chloride conversion rate B. The thermal stabilities of the catalyst were compared by calculating the deterioration degree as in the following equation using the ratio of the conversion rate A to the conversion rate B. The results thereof are shown in [Table 2].

$$\text{Deterioration degree \%} = 100 - \left(\frac{\text{Conversion rate } B}{\text{Conversion rate } A} \times 100\right) \quad \text{[Equation 2]}$$

Experimental Example 3—Evaluation of Physical Properties of Molding Catalyst

[Table 3] shows the results of measuring the catalyst BET specific surface area, total pore volume, and crushing strength of Examples and Comparative Examples. The specific surface area was measured according to a Brunauer Emmett Teller (BET) measurement method, and the total pore volume was measured according to a mercury intrusion method. In addition, the crushing strength was measured as follows.

In order to evaluate the mechanical strength of the molding catalyst, the crushing strength in the longitudinal direction was measured using Chatillon force gauge DFE2-025 (100N×0.1). After flattening the upper and lower ends of the molding catalyst sample using sandpaper, the molding catalyst was placed on a measuring stand in the vertical direction. The force gauge was brought into contact with the molding catalyst at a descending speed of 5 mm/sec, and the crushing strength was measured at the moment the molding catalyst was destroyed. After measuring the crushing strengths of 15 samples for each molding catalyst, the average value of the remaining values excluding the maximum and minimum values was recorded.

TABLE 1

| Classification | Comparative Example 1 | Comparative Example 2 | Example 1 | Example 2 | Example 3 |
|---|---|---|---|---|---|
| Catalyst information | 2% $RuO_2$-5% $CeO_2/TiO_2$ powder catalyst | 2% $RuO_2/TiO_2$ pellet catalyst | 2% $RuO_2$-5% $CeO_2/TiO_2$ pellet catalyst | 2% $RuO_2$-5% $CeO_2/TiO_2$ pellet catalyst | 2% $RuO_2$-5% $CeO_2/TiO_2$ pellet catalyst |
| Conversion rate | 29% | 21% | 37% | 7% | 11% |
| Generation of differential pressure during reaction | ○ | X | X | X | X |

TABLE 2

| Classification | Comparative Example 1 | Comparative Example 2 | Example 1 | Example 2 | Example 3 |
|---|---|---|---|---|---|
| Catalyst information | 2% $RuO_2$-5% $CeO_2/TiO_2$ powder catalyst | 2% $RuO_2/TiO_2$ pellet catalyst | 2% $RuO_2$-5% $CeO_2/TiO_2$ pellet catalyst | 2% $RuO_2$-5% $CeO_2/TiO_2$ pellet catalyst | 2% $RuO_2$-5% $CeO_2/TiO_2$ pellet catalyst |
| Deterioration degree | 7% | 47% | 21% | 23% | 12% |

TABLE 3

| Classification | Comparative Example 1 | Comparative Example 2 | Example 1 | Example 2 | Example 3 |
|---|---|---|---|---|---|
| Catalyst information | 2% $RuO_2$-5% $CeO_2/TiO_2$ powder catalyst | 2% $RuO_2/TiO_2$ pellet catalyst | 2% $RuO_2$-5% $CeO_2/TiO_2$ pellet catalyst | 2% $RuO_2$-5% $CeO_2/TiO_2$ pellet catalyst | 2% $RuO_2$-5% $CeO_2/TiO_2$ pellet catalyst |
| BET specific surface area | 29 $m^2/g$ | 32 $m^2/g$ | 31 $m^2/g$ | 30 $m^2/g$ | 29 $m^2/g$ |
| Total pore volume | 0.2602 ml/g | 0.4201 | 0.4043 ml/g | 0.4098 ml/g | 0.4076 ml/g |
| Crushing strength | — | 43.8N | 5.2N | 34.8N | 45.6N |

It can be confirmed from the results in Table 1 that, in the case of the powder catalyst according to Comparative Example 1, it is difficult to apply to a fixed bed reactor because a differential pressure occurs, but in the case of the molding catalyst according to Example 1, there was no differential pressure and the catalytic activity (conversion rate) was higher than the catalytic activity of the powder catalyst of Comparative Example.

It can be confirmed from the results in Table 2 that, in the case of Example which is the molding catalyst to which cerium oxide is added, relatively high thermal stability can be provided, compared to Comparative Example 2, which is the ruthenium-based molding catalyst.

That is, when the catalyst is prepared according to the active material, the support, and the molding method according to Examples 1 to 3 of the present invention, it can be confirmed that the catalytic activity and thermal stability can be controlled.

In addition, it can be confirmed from the results in Table 3 that the molding catalyst according to the present invention is provided to have a specific surface area of 5 to 300 $m^2/g$, a total pore volume of 0.1 to 2 ml/g, and a crushing strength of 3 to 200 N. Preferably, the molding catalyst may be provided to have a specific surface area of 5 to 50 $m^2/g$, a total pore volume of 0.2 to 1 ml/g, and a crushing strength of 3 to 150 N.

Therefore, the catalyst according to the present invention is not restricted by the type of reactor, operating conditions, and the like, has no restrictions on use, and is easy to handle. In particular, the molding catalyst can be used without generating differential pressure when applied to a fixed bed reactor, and can increase catalytic activity and enhance thermal stability, thereby providing the effect of improving durability. Therefore, anhydrous hydrochloric acid oxidation reaction through a fixed bed reactor became possible.

Furthermore, by applying various catalyst molding methods according to the present invention, catalytic activity and thermal stability can be controlled, and the catalyst having high activity and high durability can be provided and utilized for various purposes.

While the present invention has been described by particular matters such as specific components and limited embodiments and drawings, this is provided only for helping the comprehensive understanding of the present invention. The present invention is not limited to the above-described embodiments, and it will be understood by those of ordinary skill in the art that various modifications and variations can be made thereto without departing from the scope of the present invention.

Therefore, it will be understood that the spirit of the present invention should not be limited to the above-described embodiments and the claims and all equivalent modifications fall within the scope of the present invention.

MODE OF DISCLOSURE

Reference is made to the accompanying drawing which shows, by way of illustration, specific embodiments in which the present invention may be practiced. The embodiments will be described in detail in such a manner that the present invention can be carried out by those of ordinary skill in the art. It should be understood that various embodiments of the present invention are different from each other, but need not be mutually exclusive. For example, certain shapes, structures, and features described herein may be implemented in other embodiments without departing from the spirit and scope of the present invention in connection with one embodiment. In addition, it will be understood that the locations or arrangement of individual components in the disclosed embodiments can be changed without departing from the spirit and scope of the present invention. Therefore, the following detailed description is not to be taken in a limiting sense, and the scope of the present invention is to be limited only by the appended claims and the entire scope of equivalents thereof, if properly explained.

Hereinafter, preferred embodiments of the present invention will be described in detail with reference to the accompanying drawing, so that those of ordinary skill in the art can easily carry out the present invention.

According to the present invention, there is provided a molding catalyst for hydrogen chloride oxidation reaction used in a method for producing chlorine by oxidizing hydrogen chloride.

According to an embodiment of the present invention, the catalyst is provided by including 0.5 to 20 parts by weight of a heterogeneous material, 0.1 to 20 parts by weight of ruthenium oxide as an active ingredient, and 60 to 99 parts by weight of a support based on 100 parts by weight of the catalyst. The heterogeneous material may be preferably included in an amount of 1 to 10 parts by weight. In this range, it is possible to improve the yield of the product and secure thermal stability. As the active ingredient, ruthenium oxide may be preferably included in an amount of 0.3 to 10 parts by weight. When ruthenium oxide is included in an amount of less than 0.3 parts by weight, activity as a catalyst may be insufficient, and when ruthenium oxide is included in an amount of 10 parts by weight, it is disadvantageous in terms of costs.

According to an embodiment of the present invention, the heterogeneous material is provided by including at least one selected from ceria, alumina, and silica. Ceria may be preferably included to provide improved thermal stability.

According to an embodiment of the present invention, the support may be provided by including at least one selected from alumina, titania, and zirconia. Titania may be preferably provided.

According to an embodiment of the present invention, the molding catalyst is preferably provided in the pellet form. In this case, the pellet is provided by including at least one selected from a sphere, a cylinder, a hollow tube, a ring, and a trilobes. When a catalyst in powder form is provided in a fixed bed reactor, it is possible to solve the disadvantage that there are many restrictions on the type of reactor, operating conditions, and the like.

According to an embodiment of the present invention, the molding catalyst is provided with a diameter of 1 to 10 mm. When the diameter of the molded body is too large, a packing problem may occur when charging the catalyst, and when the diameter is too small, there may occur a problem that the strength of the catalyst is weakened. Therefore, it is preferable that the diameter of the molding catalyst is in the range of 1 to 10 mm.

According to an embodiment of the present invention, the molding catalyst is provided with a specific surface area of 5 to 300 $m^2/g$. The specific surface area of the support can be measured by a commonly used BET method, and may be preferably in the range of 5 to 50 $m^2/g$. When the specific surface area is greater than the above range, there may be difficulties in securing thermal stability of ruthenium oxide. When the specific surface area is less than the above range, there is a problem in that high dispersion is difficult and the catalytic activity is also lowered. Therefore, the above range is preferable.

According to an embodiment of the present invention, the molding catalyst is provided with a total pore volume of 0.1 to 2 ml/g, and preferably 0.2 to 1 ml/g. The molding catalyst is provided with a crushing strength of 3 to 200 N, and preferably 3 to 150 N. This can provide high activity or high durability.

According to an embodiment of the present invention, in the molding catalyst, ruthenium has an oxidation number of 4, ruthenium dioxide ($RuO_2$) is preferably provided, and the molding catalyst is used to produce chlorine by oxidizing hydrogen chloride. However, the oxidation number and the form are not limited thereto.

On the other hand, according to an embodiment of the present invention, there is provided a method for producing a molding catalyst for hydrogen chloride oxidation reaction according to Methods 1 to 3. Hereinafter, the same contents as the molding catalyst described above may be applied, and redundant descriptions thereof will be omitted. In addition, the order in the producing method may be modified as necessary, which means that modifications can be made freely at the level of those of ordinary skill in the art.

In an embodiment of the present invention, according to method 1, there is provided a method for producing a molding catalyst for hydrogen chloride oxidation reaction, the method including: a first supporting step of supporting a solution, in which at least one selected from heterogeneous materials is dissolved, on a support; a step of obtaining a solid by performing primary drying, calcining, and cooling after the first supporting step; a step of preparing a molding support by mixing and molding an organic binder, an inorganic binder, and water with the solid; a step of preparing a molded body after performing secondary drying, calcining, and cooling on the molding support; a second supporting step of preparing a solution in which a ruthenium precursor is dissolved and supporting the molded body; and a step of performing tertiary drying and calcining after the second supporting step.

According to an embodiment of the present invention, the heterogeneous material is provided with a step of preparing a solution in which at least one precursor selected from cerium, aluminum, and silica is dissolved in a solvent and supporting the solution on a support. In this case, the precursor, for example, a cerium precursor may be present in the form of a complex salt, and may include a cerium compound, and in particular, metal salts such as cerium nitrate, cerium acetate, or cerium chloride. Cerium nitrate is preferably provided, but the present invention is not limited thereto.

When preparing a solution in which at least one selected from the heterogeneous material is dissolved, a solvent used is provided by including at least one selected from water, alcohol, and nitrile. The water provided herein is high-purity water such as distilled water, ion-exchanged water, or deionized water (DIW). When the water used herein contains impurities, the impurities may adhere to the catalyst and reduce the activity of the catalyst. In the case of alcohol, the organic solvent may be a monoalcohol, and a C3 or higher primary alcohol is provided. A C3 alcohol-based organic solvent is preferably provided, and 1-propanol is preferably provided. By utilizing high wettability and hydrophobicity of the solution, the ruthenium component can be supported only on the outer surface of the titania support in which a hydroxyl group (—OH) is present. Therefore, it is possible to provide an effect of increasing the dispersion degree of ruthenium supported on the surface of the titanium oxide molding support or the powder support. In addition, although there is no limitation on the amount of the solvent provided herein, if the amount of the solvent is too large, the drying time increases. Therefore, the amount of the solvent can be adjusted freely at the level of those of ordinary skill in the art.

According to an embodiment of the present invention, the support may include at least one selected from alumina, titania, and zirconia. The support may be preferably supported on the titania support.

The supporting includes impregnation or immersion. The temperature in this case is 0° C. to 100° C., which is usually applied, and preferably 0° C. to 50° C., and the pressure is 0.1 to 1 MPa, which is usually applied, and preferably atmospheric pressure. The supporting may be performed in an air atmosphere or an inert gas atmosphere such as nitrogen, helium, argon, or oxygen dioxide. In this case, water vapor may be included. The supporting is preferably provided in the inert gas atmosphere, but the present invention is not limited thereto.

The titania support may be anatase-type titania, rutile-type titania, amorphous titania, or a mixture thereof. In addition, the titania support may include an oxide such as alumina, zirconia, or niobium oxide. Rutile-type titania is preferably provided. For example, titania available from Sakai may be provided, but the present invention is not limited thereto. A specific surface area of the titania support may be measured by a commonly used BET method, and may be 5 to 300 $m^2/g$, and preferably 5 to 50 $m^2/g$.

In addition, in the case of the aluminum support, α-alumina is preferably provided. Preferably, since the alpha-alumina has a low BET specific surface area, absorption of other impurities is difficult to occur. In this case, the specific surface area is 10 to 500 $m^2/g$, and preferably 20 to 350 $m^2/g$.

The zirconia support has pores in the range of 0.05 to 10 μm and has the same specific surface area as described above.

According to an embodiment of the present invention, after the first supporting step, a step of obtaining a solid after primary drying, calcining, and cooling is provided. In this case, the drying is performed at 10° C. to 120° C. for 3 hours to 5 hours.

The drying can be performed while performing rotating and stirring. The drying can be performed by vibrating a drying container or using a agitator provided in a container, but the present invention is not limited thereto. The drying temperature may be in the range from room temperature, which is normally applied, to 100° C., and the pressure may be in the range from 0.1 to 1 MPa, which is normally applied. The pressure may be preferably atmospheric pressure.

In addition, the calcining may be performed at 300° C. to 600° C. for 2 hours to 6 hours, and the cooling is performed to room temperature. The calcination temperature is provided with a temperature that is normally applied, and is preferably 250° C. to 450° C. The oxidizing gas provided for calcination includes, for example, an oxygen-containing gas. The oxygen concentration is in the range of 1 to 30 vol %, which is normally applied. As an oxygen source, air or pure oxygen is generally provided, and inert gas or water vapor may be included as necessary. The oxidizing gas may be preferably air. The oxidizing gas is calcined at about 350° C. for about 3 hours in an electric furnace under air flow and cooled to room temperature of 1° C. to 35° C.

The calcination oxidizes cerium to cerium oxide (ceria). The cerium oxide can secure stability even at a relatively high temperature. In the case of the reaction involving the cerium oxide catalyst, thermal stability is provided at an average temperature of 250° C. to 600° C., and preferably 300° C. to 550° C. However, when the average temperature is higher than 600° C., there is a disadvantage in chlorine conversion rate during chlorine production, and when the average temperature is lower than 250° C., the catalytic activity of cerium is reduced. Therefore, it is preferable to ensure thermal stability by controlling the reaction in the above range.

According to an embodiment of the present invention, a step of preparing a molding support by mixing and molding an organic binder, an inorganic binder, and water with the solid is provided. In this case, the organic binder provided herein includes at least one selected from methyl cellulose, hydroxyethyl cellulose, sodium carboxymethyl cellulose, purified starch, dextrin, polyvinyl alcohol, polyvinyl butyral, polymethyl methacrylate, polyethylene glycol, paraffin, wax emulsion, and microcrystalline wax. Since the organic binder is included, an effect of improving moldability can be provided.

In addition, the inorganic binder includes at least one selected from alumina sol, silica sol, titania sol, and zirconia sol. Since the inorganic binder is included, an effect of improving mechanical properties can be provided.

According to an embodiment of the invention, the molding support is produced by including 30 to 150 parts by weight of the water, 1 to 15 parts by weight of the organic binder, and 5 to 30 parts by weight of the inorganic binder based on 100 parts by weight of the solid. By molding the support in the above ranges, an effect of improving mechanical properties can be provided.

According to an embodiment of the present invention, a step of preparing a molded body after performing secondary drying, calcining, and cooling on the molding support is provided. In this case, the case of drying, calcining, and cooling is the same as described above.

According to an embodiment of the invention, a second supporting step of preparing a solution in which a ruthenium precursor is dissolved and supporting the molded body on the solution is provided. The ruthenium precursor may be present in the form of a complex salt, and may include metal salts such as halides, halogenates, oxoates, oxyhalides, and chlorides. For example, the ruthenium precursor may include $RuCl_3$, $RuBr_3$, $K_3RuCl_6$, $K_2RuCl_6$, $K_2RuO_4$, $Na_2RuO_4$, $Ru_2OCl_4$, $Ru_2OCl_5$, $Ru_2OCl_6$, and the like.

According to embodiment of the present invention, halide is preferably provided as the ruthenium precursor, and ruthenium chloride including chloride is most preferably provided as the ruthenium precursor. In some cases, a hydrate of a ruthenium compound may be provided as the ruthenium compound, and two or more selected from the ruthenium compounds may be provided.

The ruthenium chloride may be used in the powder form and mixed in a solvent, and a solid support is suspended in the solvent to form a precipitate, so that the precipitate is deposited on the solid support. The supporting includes impregnation or immersion. The temperature in this case is 0° C. to 100° C., which is usually applied, and preferably 0° C. to 50° C., and the pressure is preferably atmospheric pressure. The supporting may be performed in an air atmosphere or an inert gas atmosphere such as nitrogen, helium, argon, or oxygen dioxide. In this case, water vapor may be included. The supporting is preferably provided in the inert gas atmosphere, but the present invention is not limited thereto.

According to an embodiment of the present invention, a molding catalyst can be finally obtained through a third drying and calcining step after the second supporting step. In this case, the case of drying and calcining is the same as described above.

In an embodiment of the present invention, according to Method 2, there is provided a method for producing a molding catalyst for hydrogen chloride oxidation reaction, the method including: a step of preparing a molding support by mixing and molding an organic binder, an inorganic binder, and water with a support; a step of preparing a molded body after performing primary drying, calcining, and cooling on the molding support; a step of supporting a solution, in which at least one selected from heterogeneous materials and a ruthenium precursor are dissolved, on the molded body; and a step of performing secondary drying and calcining after the supporting step.

In an embodiment of the present invention, according to Method 3, there is provided a method for producing a molding catalyst for hydrogen chloride oxidation reaction, the method including: a step of preparing a molding support by mixing an organic binder, an inorganic binder and water with a support; a step of preparing a molded body by performing primary drying, calcining, and cooling after the molding step; a first supporting step of supporting a solution, in which at least one precursor selected from heterogeneous materials is dissolved, on the molded body; a step of obtaining a solid body by performing secondary drying, calcining, and cooling after the first supporting step; a second supporting step of supporting a solution, in which a ruthenium precursor is dissolved, on the molded body; and a step of performing tertiary drying and calcining after the second supporting step.

Compared with Method 2 and Method 3, in the case of Method 1, a molding support is prepared by pre-adding a heterogeneous material, and a ruthenium precursor is post-added and supported. However, in the case of Method 2 and Method 3, a molding support is prepared in advance, and a heterogeneous material and a ruthenium precursor are post-added. Method 2 differs from Method 3 in that Method 2 simultaneously adds the heterogeneous material and the ruthenium precursor, and Method 3 pre-adds the ruthenium precursor and post-adds the ruthenium precursor. In addition, it is apparent that the support, the organic binder, the inorganic binder, and the producing method related to drying, calcining, and cooling may be applied in the same manner.

However, according to an embodiment of the present invention, in Method 2 and Method 3, the molding of the catalyst is pre-produced, and the catalyst may be produced by including 30 to 150 parts by weight of the water, 1 to 15 parts by weight of the organic binder, and 5 to 30 parts by weight of the inorganic binder based on 100 parts by weight of the support.

According to an embodiment of the present invention, the molding catalyst is molded to be applicable to a fixed bed reactor. Therefore, the molded catalyst is not restricted by the type of reactor, operating conditions, and the like, has no restrictions on use, and is easy to handle. In particular, when applied to a fixed bed reactor, the catalyst can be used without differential pressure and can increase catalytic activity and enhance thermal stability, thereby providing improved durability. The result for this can be confirmed in the result values of embodiments to be described below.

According to an embodiment of the present invention, there is provided a method for producing chlorine through hydrogen chloride oxidation reaction in the presence of the molding catalyst. As the mode of the reaction, a fixed bed mode, a fluidized bed mode, a gas phase reaction, and the like may be provided. Preferably, the gas phase reaction is provided. The oxidation reaction is an equilibrium reaction and, when the oxidation reaction is performed at extremely high temperature, the equilibrium conversion rate decreases. Therefore, it is preferable to perform the oxidation reaction at a relatively low temperature. The reaction temperature is usually in the range of 100° C. to 500° C., preferably 200° C. to 450° C., and most preferably 250° C. In addition, the reaction pressure is usually about 0.1 to about 5 MPa. As the oxygen source, air may be used, or pure oxygen may be used. The theoretical molar amount of oxygen relative to hydrogen chloride is ¼ mole, but 0.1 to 10 times oxygen is typically provided. In addition, the supply rate of hydrogen chloride is expressed by the gas supply rate per 1 L of catalyst (L/h; 0° C., converted to 1 atm), that is, GHSV, and is usually about 10 to about 20000 $h^{-1}$. However, in this case, the amount of the catalyst added may be slightly changed depending on the temperature, the amount of the catalyst, and the amount of the chlorine product.

The invention claimed is:

1. A method for producing a molding catalyst for hydrogen chloride oxidation reaction, the method comprising:
   a first supporting step of supporting a solution, in which a precursor of at least one selected from heterogeneous materials is dissolved, on a support;
   a step of obtaining a solid after performing primary drying, calcining, and cooling after the first supporting step;
   a step of preparing a molding support by mixing and molding an organic binder, an inorganic binder, and water with the solid;
   a step of preparing a molded body after performing secondary drying, calcining, and cooling on the molding support;

a second supporting step of preparing a solution in which a ruthenium precursor is dissolved and supporting the molded body; and a step of performing tertiary drying and calcining after the second supporting step-, wherein the molding support includes at least one selected from a group consisting of alumina, titania, and zirconia, wherein the organic binder includes at least one selected from a group consisting of methyl cellulose, hydroxyethyl cellulose, sodium carboxymethyl cellulose, purified starch, dextrin, polyvinyl alcohol, polyvinyl butyral, polymethyl methacrylate, polyethylene glycol, paraffin, wax emulsion, and microcrystalline wax, wherein the inorganic binder includes at least one selected from a group consisting of alumina sol, silica sol, titania sol, and zirconia sol, wherein the heterogeneous material includes ceria.

2. The method of claim 1, wherein, in the step of preparing the molding support, 30 to 150 parts by weight of the water, 1 to 15 parts by weight of the organic binder, and 5 to 30 parts by weight of the inorganic binder are included based on 100 parts by weight of the solid.

3. The method of claim 1, wherein the drying is performed at 10° C. to 120° C. for 3 hours to 12 hours.

4. The method of claim 1, wherein the calcining is performed at 300° C. to 600° C. for 2 hours to 6 hours.

5. The method of claim 1, wherein the cooling is performed at room temperature of 1° C. to 35° C.

6. A method for producing a molding catalyst for hydrogen chloride oxidation reaction, the method comprising:

a step of preparing a molding support by mixing and molding an organic binder, an inorganic binder, and water with a support;

a step of preparing a molded body after performing primary drying, calcining, and cooling on the molding support;

a step of supporting a solution, in which a precursor of at least one selected from heterogeneous materials and a ruthenium precursor are dissolved, on the molded body; and a step of performing secondary drying and calcining after the second supporting step, wherein the molding support includes at least one selected from a group consisting of alumina, titania, and zirconia, wherein the organic binder includes at least one selected from a group consisting of methyl cellulose, hydroxyethyl cellulose, sodium carboxymethyl cellulose, purified starch, dextrin, polyvinyl alcohol, polyvinyl butyral, polymethyl methacrylate, polyethylene glycol, paraffin, wax emulsion, and microcrystalline wax, wherein the inorganic binder includes at least one selected from a group consisting of alumina sol, silica sol, titania sol, and zirconia sol, wherein the heterogeneous material includes at least one selected from a group consisting of ceria, alumina, and silica.

7. The method of claim 6, wherein, in the step of preparing the molding support, 30 to 150 parts by weight of the water, 1 to 15 parts by weight of the organic binder, and 5 to 30 parts by weight of the inorganic binder are included based on 100 parts by weight of the support.

8. A method for producing a molding catalyst for hydrogen chloride oxidation reaction, the method comprising:

a step of preparing a molding support by mixing an organic binder, an inorganic binder, and water with a support;

a step of preparing a molded body by performing primary drying, calcining, and cooling after the molding step;

a step of supporting a solution, in which a precursor of at least one selected from heterogeneous materials is dissolved, on the molded body;

a step of obtaining a solid by performing secondary drying, calcining, and cooling after the first supporting step;

a second supporting step of supporting a solution, in which a ruthenium precursor is dissolved, on the molded body; and a step of performing tertiary drying and calcining after the second supporting step-, wherein the molding support includes at least one selected from a group consisting of alumina, titania, and zirconia, wherein the organic binder includes at least one selected from a group consisting of methyl cellulose, hydroxyethyl cellulose, sodium carboxymethyl cellulose, purified starch, dextrin, polyvinyl alcohol, polyvinyl butyral, polymethyl methacrylate, polyethylene glycol, paraffin, wax emulsion, and microcrystalline wax, wherein the inorganic binder includes at least one selected from a group consisting of alumina sol, silica sol, titania sol, and zirconia sol, wherein the heterogeneous material includes at least one selected from a group consisting of ceria, alumina, and silica.

* * * * *